United States Patent [19]
Norris

[11] 4,108,000
[45] Aug. 22, 1978

[54] GAUGE GLASS PROTECTOR

[75] Inventor: Orlin R. Norris, Parsippany, N.J.

[73] Assignee: JeNor, Morristown, N.J.

[21] Appl. No.: 793,994

[22] Filed: May 5, 1977

[51] Int. Cl.² ............................................. G01F 23/02
[52] U.S. Cl. ......................................... 73/328; 62/125
[58] Field of Search ................ 73/329, 328, 326, 331, 73/334, 325, 330, 297, 325; 62/125

[56] References Cited

U.S. PATENT DOCUMENTS

| | | | |
|---|---|---|---|
| 1,164,484 | 12/1915 | Ernst | 73/328 X |
| 1,387,676 | 8/1921 | Wright | 73/328 |
| 1,701,914 | 2/1929 | Ernst | 73/328 |
| 3,862,572 | 1/1975 | Norris | 73/328 |

Primary Examiner—Daniel M. Yasich
Attorney, Agent, or Firm—Richard C. Woodbridge

[57] ABSTRACT

A gauge glass protector includes an annular grommet carried by a frustro-conical skirt and an inverted collector rim at the circumference of the skirt. A drainage hole for condensate is located at the juncture of the collector rim and the conical skirt for draining the collected liquid out of the trough formed between the skirt and the rim. The same device may be used as an aerosol mist collector by inverting it. In another embodiment of the invention the skirt may comprise a semi-circular flexible collar which when assembled has a frustro-conical shape. Another embodiment calls for a spiral wire attached to the sight gauge including a conical run-off trough at the point where the wire is tangential to the gauge.

7 Claims, 8 Drawing Figures

GAUGE GLASS PROTECTOR

BACKGROUND OF THE INVENTION

1. Field of the Invention

This invention relates to a device for protecting gauge glasses.

2. Description of the Prior Art

It is customary to determine the level of water in a steam boiler by means of an external liquid level glass gauge assembly. Such an assembly typically comprises a thick walled transparent tube held in position by an upper and lower valve body arrangement. The upper valve body is connected to that portion of the boiler which is permanently in the vapor state and the lower valve body is connected to that portion of the boiler which should always contain water. Accordingly, the level of liquid in the transparent tube indicates the level of the vapor/liquid interface inside the boiler.

The criteria for the use and maintenance of such sight gauges are well known and are set forth in the suggested *Rules of Care of Power Boilers* (1971 Edition) (Section VII, Sub Section C2 201 through 210 and C5 608 through C5 609 published by The American Society of Engineers, New York, N.Y.). Because of the high pressures and temperatures involved in steam boilers it is desirable to have a tight seal between the gauge glass and the gauge glass holding bodies. This seal is usually provided by means of a rubber gasket which is compressed into place by a sealing nut. It has been found in practice that under operative conditions it is virtually impossible to maintain an absolutely leak-proof seal due to the degradation of the gasket material under operating conditions. Unfortunately, it is impractical to replace the gasket as soon as degradation begins. Therefore, it is the usual practice to put up with a certain amount of degradation in order to avoid the expense and inconvenience of shuting down the boiler at inopertune moments. If the gasket deteriorates while the boiler is operating at a high temperature and high pressure, then three serious disadvantages arise. First, the leaking vapor in aerosol form settles onto the sight gauge and obscures the line of vision, thereby preventing accurate readings. Second, the continual presence of such liquids will eventually erode the surface of the gauge glass. Thirdly, as the liquids evaporate they leave behind previously dissolved solid materials. It has been found that unless these deposits of solid materials are either prevented or are immediately removed, they will eventually cloud up the entire sight gauge. It is often difficult and unsafe to keep sight gauges clean since the gauges are generally located at a height of about 14 ft. above ground floor level and in very close proximity to boilers operating at temperatures in the range of 400° F.

The nature of this problem has been known for a good many years. One method for coping with the problem is to provide better sealing gaskets at both ends of the sight gauge. Devices for improving the sealing between both ends of the gauge glasses are discussed in U.S. Pat. Nos. 1,038,642 and 2,629,262. Alternatively, mechanisms have been proposed and used to help keep the gauges clean. One such solution is found in U.S. Pat. No. 1,234,191 to Mahaley, issued July 24, 1917 which discloses an automatic gauge glass wiper. Another GAUGE CLEANING DEVICE is disclosed in U.S. Pat. No. 2,206,006 to Hendrey issued June 25, 1940.

Another approach to the same problem is to provide the gauge with a deflector right below its upper gasket so as to carry the steam and condensate away from the surface of the glass itself. An early type of deflector is disclosed in U.S. Pat. No. 1,387,676 issued on Aug. 16, 1921 to P. I. Wright. An improvement in gauge glass deflectors is also disclosed in U.S. Pat. No. 3,862,572 issued on Jan. 28, 1975 to Orlin R. Norris, the inventor of the device disclosed herein.

The devices described in U.S. Pat. Nos. 1,387,676 and 3,862,572 are believed to be satisfactory under general working conditions. However, there still continues to be a need for an effective, inexpensive gauge glass protector which does not possess the disadvantages inherent in the prior art.

While the problems of the prior art discussed above refer to the use of gauge glasses on steam boilers, it will be appreciated by those of ordinary skill in the art that the same sight gauge problems may be equally applicable to oil/ammonia systems such as used in conjunction with refrigeration compressors, holding tanks for cryogenic or freezing liquids, heated or unheated, fired or unfired pressure vessels used at, below or above atomspheric pressure.

SUMMARY OF THE INVENTION

Briefly described the invention comprises an improved gauge glass protector for use on gauge glasses such as found in a steam boiler system. The gauge glass protector, according to the preferred embodiment of the invention, comprises a frustroconical skirt having an up-turned collector rim around the base thereof. The conical skirt includes a hole at the center thereof for accomodating a small rubber gasket having an internal diameter slightly less than the outside diameter of the gauge glass. The protector when used in the deflector mode is preferably located about ½ inch below the upper valve body packing nut in an umbrella-like fashion. The steam escaping from the packing nut is deflected down the skirt and collected in the collector rim. At least one small drain hole is located at the junction between the conical skirt and the collector rim for the purpose of carrying the collected liquid away from the glass and letting it fall harmlessly to the floor. A drip wire may be placed in the drip hole in order to conduct the liquid away more efficiently.

By inverting the protector/deflector it is possible to use it as a vapor collector. In this mode the shield in its inverted position is located approximately 1 inch below the upper valve body packing nut. This method is especially effective with very fine escaping aerosol mists which do not contain a great deal of liquid. If the mist is sufficiently fine, the collector will trap the mist and allow it to evaporate before the shield overflows.

According to another embodiment of the present invention the protector skirt may be made from a flat piece of semi-soft material. The flat material is equipped with a tab and slot arrangement so that when the tab engages the slot the skirt assumes a three dimensional conical shape. The advantage of this particular embodiment is that it enables the deflector to be attached to the gauge glass without the necessity of removing the glass from the boiler.

In yet another embodiment the gauge glass protector comprises a helical coil of plastic which by the constriction of its coil elements adheres to the gauge glass near the location of the upper packing nut. The bottom end of the coil includes a straight discharge trough for removing condensate collected by the coil away from the vicinity of the gauge glass. These and other embodiments of the invention will be more fully understood with reference to the drawings.

DETAILED DESCRIPTION OF THE INVENTION

During the course of this description like numbers will be used to indicate like elements according to the different views of the invention.

Figure 1:
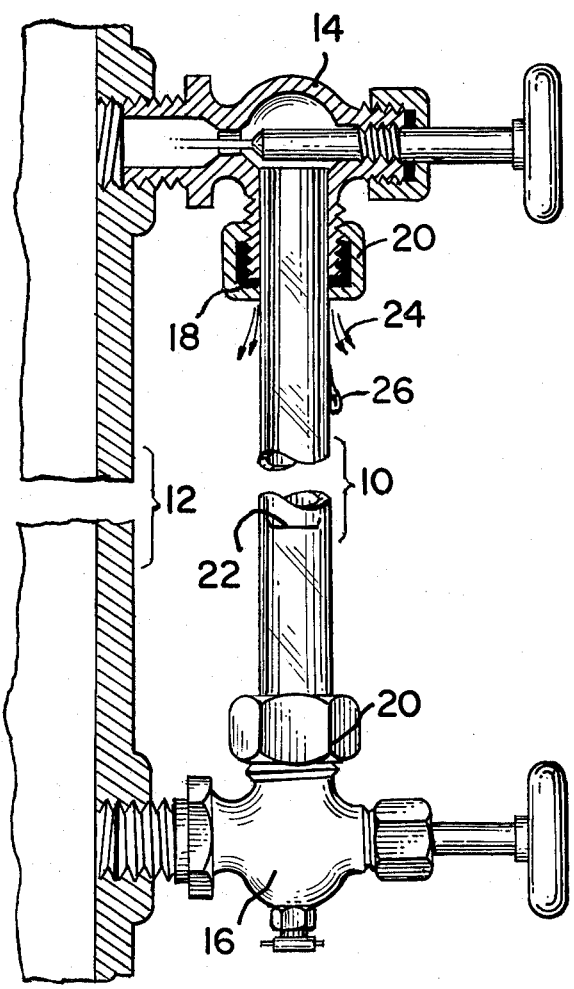
FIG. 1 is a side elevational view of a conventional sight gauge in position on the side of a vessel.

Details of a conventional sight gauge 10 can be understood with reference to FIG. 1. For the purposes of this description the terms "sight gauge" and "gauge glass" can be used interchangeably. The gauge glass 10 is typically tubular and transparent and connected via appropriate fittings to a gas/liquid system 12. Gauge glasses are frequently found on steam boilers but may also be employed in a variety of other contexts too numerous to mention individually. The gauge glass protectors described herein are believed to be usable on almost any type of conventional gauge glass.

The gauge glass 10 is connected to the vapor phase of the vessel 12 by means of upper valve 14. In a similar manner, the lower end of the gauge glass 10 is connected through lower valve 16 to the liquid phase of the vessel 12. There are many ways in which the glass 10 may be sealed with respect to the upper and lower valves 14 and 16. However, it is generally preferred that the glass be held in position by means of a sealing gland or basket 18 and a compression nut 20 both of which elements may be seen in partial cross-section with respect to the upper valve 14.

The glass may be removed and replaced by unscrewing the compression nuts 20, dislodging the gaskets 18 and taking the gauge glass 10 out of its receiving sockets. A new glass 10 may be replaced by putting a new gasket 18 at both ends thereof and then compressing the seals 18 against the seats in their respective valve bodies 14 and 16 by means of compression nuts 20. When both valves 14 and 16 are open it is possible to accurately read the level of liquid 22 in the boiler.

Even with the best of materials, it is difficult to avoid having mist or liquid escape from the sealing gasket 18 located in the valve 14. The escape of a fine aerosol or mist 24 is illustrated in FIG. 1. If the seal is weaker then it is likely that droplets of liquid condensate 26 may also escape. In order to minimize the dangers inherent with escaping liquids it has been found desirable to provide the gauge glass 10 with some form of protector.

Figure 2A:
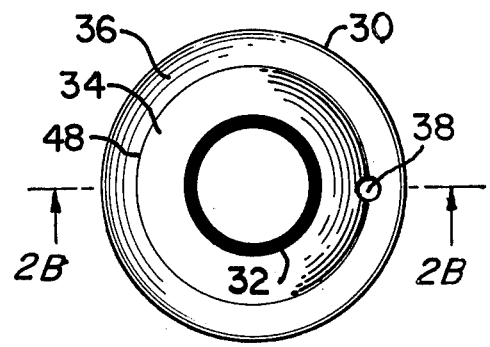
FIG. 2A is a top plan view of the gauge glass protector according to the preferred embodiment of the present invention.
Figure 2B:
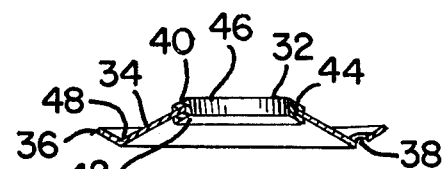
FIG. 2B is a cross-sectional view of the gauge glass protector illustrated in FIG. 2A, as seen from perspective 2B—2B.

A gauge glass protector 30 according to the preferred embodiment of the present invention is illustrated in FIGS. 2A and 2B. The protector 30 is shown in a top plan view in FIG. 2A and includes an annular center grommet 32, a frustro-conical skirt 34 and a collector rim 36. A drain hole 38 is located at the juncture of the skirt 34 and the rim 36. The purpose of the drain hole 38 is to discharge liquid trapped in the trough 48 formed between the skirt 34 and the rim 36. Drain hole 38 should be sufficiently far away from the grommet 32 so that the liquid issuing therefrom does not accidentally fall upon the glass gauge itself.

Figures 3, 4:
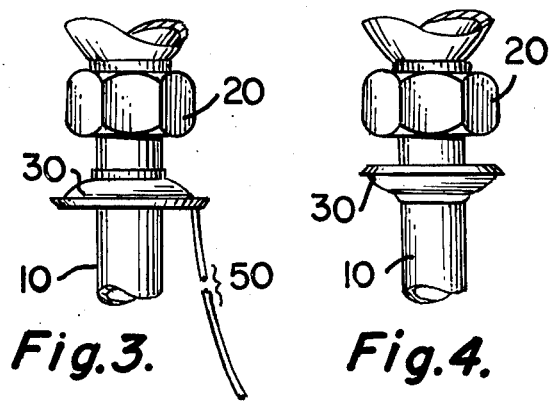
FIG. 3 is an elevational view of the gauge glass protector in position on a sight gauge in its deflector mode and including a drip wire connected thereto.
FIG. 4 is an elevational view illustrating the use of the gauge glass protector in its collector mode.

The grommet 32 has an upper tapered surface 40 and a lower tapered surface 42. Intermediate the two tapered surfaces 40 and 42 is a circumferential groove 44 which is adapted to receive the upper annular edge of skirt 34. The upper tapered surface 40 serves to direct liquid downwardly onto the skirt 34. The lowered tapered surface 42 is advantageous when the protector is used in the collector mode as illustrated in FIG. 4. In addition, it is possible to fashion a plurality of grommets 32 from a long piece of grommet tubing material by cutting the tubular stock on a lathe like machine in such a fashion that the lower tapered surface 42 is at the inner face of the upper tapered surface 40 of the next grommet being produced.

According to the preferred embodiment of the invention the grommet material comprises a temperature and chemical resistant rubber or plastic material having an inside diameter 46 which is just slightly smaller than the outside diameter of the gauge glass 10. The skirt 34 and the rim 36 are preferably a continuous piece of lightweight corrosion resistant material such as aluminum. The drain hole 38 should be at least 3/32 inch in diameter. It is important that the drain hole be sufficiently large so that the surface tension of the liquid collected does not prevent the liquid from being discharged from trough 48.

It is desirable that the inner surface of the deflector contact the surface of the gauge glass 10 in such a manner that no leakage is possible between the upper surface 40 and the lower surface 42. This criterion is subject to the fact that absolute heat resistance is not required, however, it is desirable that the material does not disintegrate rapidly at temperatures up to 400° F under repeated exposures of not in excess of 5 minutes per exposure.

While the invention is not limited thereto, it has been found that synthetic rubbers such as, for example, neoprene, teflon, and other rubber compositions are suitable for this purpose. It has also been found that the skirt 34 and collector rim 36 may be made of other materials such as plastic, glass, clay, asbestos and sheet metal.

For a gauge glass having outside diameter of ¾ inch it might be appropriate to use a grommet 32 having an inside diameter 46 approximately 1/32 inch smaller, or about 23/32 inch. Under such circumstances, it has been found that the outside diameter of the collector rim 36 should be approximately 2 inches and that the center of the drain hole 38 should be located approximately ¼ inch inside of the outer collector rim 36. In other words, the trough 48 formed between the skirt 34 and the rim 36 is approximately ¾ inch from the axial center of the protector 30.

A gauge glass protector 30 used in the deflector mode is illustrated in FIG. 3. In this mode the minimum distance between the gasket 32 and the packing nut 20 is approximately ½ inch. The grommet 32 should grab onto the surface of the gauge glass 10 with sufficient force to keep the protector 30 in position but not so strongly as to prevent the protector 30 from being moved up and down the surface if necessary. Adjustment may be necessary in order to install the protector 30 and it may be desirable to move the protector 30 from time to time in order to clean off material desposits.

In operation the protector is located on a gauge glass 10 in the manner illustrated in FIG. 3. Liquid such as droplet 26 illustrated in FIG. 1 will roll down the gauge glass 10 and impinge upon the upper surface 40 of the grommet 32. Due to the taper of the upper surface 40 the liquid will be carried onto the frusto-conical skirt 34 and down into trough 48. As liquid is collected between the skirt 34 and the rim 36 it will eventually find its way to drain hole 38 and be discharged away from the surface of the gauge glass 10. In this manner the surface of the gauge glass 10 below the protector 30 is protected from mist 24 and liquids 26 that may leak from the upper seal 18 or that may otherwise form by condensation and so forth above the protector 30. In order to facilitate the drainage of liquid from trough 48 it may be optionally desirable to suspend a drip directing wire 50 through the drain hole 38 in such a manner as to carry the droplets further away from the surface of the gauge glass 10. The drip directing wire 50 is typically bent so that liquid flowing down the wire passes below and free of the lower valve assembly 16, thus directing the droplets of condensate harmlessly away to any chosen area below.

The protector 30 may also be used in a collector mode as illustrated in FIG. 4. In this manner the protector 30 is inverted such that the minimum distance between the inverted protector 30 and the upper packing nut 20 is approximately 1 inch. The protector 30 is especially effective in the collector mode of FIG. 4 when the escaping liquid is in the form of a fine mist 24 as illustrated in FIG. 1. If the fine mist 24 does not include much liquid then the fine mist will impinge upon the inner surface of the conical skirt 34 and will harmlessly evaporate under the influence of the ambient heat. In the collector mode the protector 30 forms a small reservoir for the escaping 24 and also tends to prevent the mist from impinging upon the lower portions of the gauge glass 10.

Figure 5:
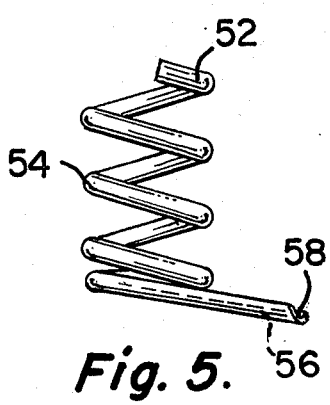
FIG. 5 illustrates an embodiment in which the gauge glass protector comprises a coiled spring having a straight run-off trough at the bottom thereof.
Figure 6:
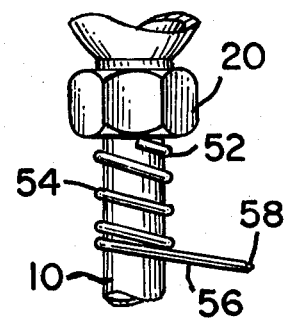
FIG. 6 illustrates the gauge glass protector of FIG. 5 as shown in position on a sight gauge.

A helical gauge glass protector 52 is illustrated in detail in FIG. 5. The helical protector 52 preferably comprises a spiral upper body 54 and a discharge trough 56. The spiral body 54 is wound in such a fashion as to be held in position when located on a glass gauge 10 as illustrated in FIG. 6. As in the case with the protector 30 previously described, the helical protector 52 must be manually movable, but must also stay in place under normal operating conditions when not effected by an outside force. The discharge section 56 of the helical protector 52 is a continuation of the spiral body 54 and includes therein a small trough 58. The end of the discharge section 56 is located well away from the body of the gauge glass 10 so that liquid issuing therefrom does not impinge upon the surface of the gauge glass.

In operation, the helical protector is located on the glass gauge in the manner illustrated in FIG. 6. Droplets of liquid which may issue from the packing gasket 18 will impinge upon the spiral body 54 and follow the spiral down the body under the influence of gravity until they arrive at the discharge section 56. The discharge section 56 is tangent to the gauge glass 10 and the travelling droplets will be picked up by the trough 58 located therein. The droplets then continue down the inclined trough where they are discharged at a safe distance away from the surface of the gauge glass 10. The helical compression protector 52 may be manufactured from a variety of known plastic or rubber covered wires or from suitable semielastic plastics. The plastic or rubber material would be selected from one of a variety of materials which are known to operate at the elevated temperatures and conditions at which the surface of the gauge glass 10 is normally subjected.

Figure 7:
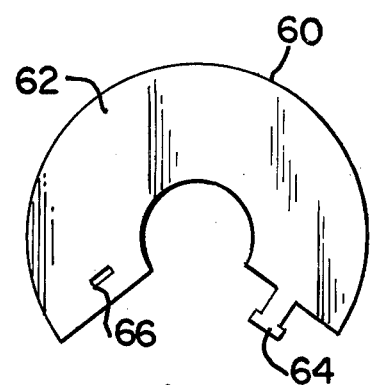
FIG. 7 is a top plan view of an embodiment in which the gauge glass protector skirt is formed from a flat piece of semi-circular material.

A flexible collar protector embodiment 60 is illustrated in its flat condition in FIG. 7. The flexible collar 60 includes a semi-circular section 62, a tab section 64, and a tab receiving slot 66. The flexible collar 60 may be attached to a gauge glass 10 by wrapping the semi-circular section 62 around the gauge glass 10 and then inserting tab 64 into tab receiving slot 66. In this manner the flexible collar 60 assumes a frustro-conical shape similar to that of the skirt 34 of protector 30. When in position the flexible collar 60 would be located approximately ½ inch below the top packing nut 20. When the flexible collar 60 is assembled, it provides umbrella type protection of the glass gauge 10 in a manner similar to that provided by the conical protector 30. That is to say the droplets 26 and aerosol mist 24 that collect on the surface of the glass will flow down the frustro-conical section 62 to the edge of the protector 60 and then fall harmlessly free of the lower section of the gauge glass thereby protecting its visibility and integrity. A variety of semi-soft rubber or plastic materials known to those of ordinary skill in the art would be suitable to produce the flexible collar 60.

While the invention has been described with reference to a preferred embodiment thereof, it will be appreciated by those of ordinary skill in the art that various changes may be made to the materials and the structure of the invention without departing from the spirit and scope thereof.

I claim:

1. A gauge glass protector apparatus for protecting the vertical gauge glass on a boiler type of liquid containing pressure vessel, said apparatus comprising:

a grommet means for frictionally engaging said gauge glass and holding said apparatus in place against said gauge glass;

a downwardly sloping skirt means for directing liquid away from said gauge glass, said downwardly sloping skirt means being attached to said grommet means;

an upwardly sloping rim connected around the edge of said downwardly sloping skirt means at a juncture, said upwardly sloping rim forming a collector trough between said rim and said downwardly sloping skirt means; and a collector trough drainage hole means located substantially at the juncture between said upwardly sloping rim and said dowardly sloping skirt means, wherein liquid travelling down said vertical glass gauge impinges upon said grommet means and is carried away from the area of said glass gauge by said downwardly sloping skirt means and into said collector though at which location said liquid harmlessly passes through said trough drainage hole means.

2. The glass gauge protector apparatus of claim 1 further including:
a drip wire means connected to said apparatus and passing through said drainage hole means for providing specific direction for the liquid passing through said drainage hole means.

3. The apparatus of claim 2 wherein said grommet means includes a first surface which is tapered to slope in the same direction as the skirt means.

4. The apparatus of claim 3 wherein said grommet means further includes a second surface tapered to slope in substantially the same direction as said first surface.

5. The apparatus of claim 4 wherein said skirt means and said collector rim comprise an aluminum like material.

6. The apparatus of claim 5 wherein said grommet means comprises a temperature and corrosion resistant rubber-like material having an inside diameter just slightly less than the outside diameter of the gauge glass.

7. The apparatus of claim 6 wherein said grommet means includes a circular groove therein for receiving said skirt means.

* * * * *